US005954910A

United States Patent [19]

Kikukawa et al.

[11] Patent Number: 5,954,910

[45] Date of Patent: Sep. 21, 1999

[54] ELASTIC FIXING ROLL

[75] Inventors: Hiroyasu Kikukawa; Hiroshi Kato, both of Okayama, Japan

[73] Assignee: Japan Gore-Tex, Inc., Tokyo, Japan

[21] Appl. No.: 08/463,440

[22] Filed: Jun. 5, 1995

Related U.S. Application Data

[62] Division of application No. 08/223,896, Apr. 6, 1994, abandoned.

[30] Foreign Application Priority Data

Apr. 8, 1993 [JP] Japan .................................... 5-106193

[51] Int. Cl.[6] ...................................................... B32B 31/26

[52] U.S. Cl. .................................... 156/307.1; 156/272.2; 156/307.3; 427/387; 427/388.2; 427/413

[58] Field of Search .................................... 427/387, 409, 427/407.1, 411.1, 413; 29/132, 130; 118/60, 70, 264, 268; 156/272.2, 307.3, 315, 329, 307.1

[56] References Cited

U.S. PATENT DOCUMENTS

| | | |
|---|---|---|
| 3,953,566 | 4/1976 | Gore . |
| 4,187,390 | 2/1980 | Gore . |
| 4,533,231 | 8/1985 | Shigenobu . |
| 4,844,953 | 7/1989 | Kato et al. . |
| 4,887,340 | 12/1989 | Kato et al. . |
| 5,014,406 | 5/1991 | Kato et al. . |
| 5,068,692 | 11/1991 | Menjo . |
| 5,123,151 | 6/1992 | Uehara et al. . |
| 5,180,899 | 1/1993 | Inasaki . |
| 5,232,499 | 8/1993 | Kato et al. . |

FOREIGN PATENT DOCUMENTS

| | | |
|---|---|---|
| 58-17129 | 2/1983 | Japan . |
| 59-172668 | 9/1984 | Japan . |
| 61151676 | 7/1997 | Japan . |

*Primary Examiner*—Merrick Dixon
*Attorney, Agent, or Firm*—Gary A. Samuels

[57] ABSTRACT

An elastic fixing roll having an elastic, compliant body material and release surface material is disclosed. The body material comprises porous silicone rubber or fluorosilicone rubber foam, or a porous synthetic polymer foam reinforced with silicone rubber or fluorosilicone rubber. The release surface material is formed of porous polytetrafluoroethylene film containing silicone rubber or fluorosilicone rubber. The elastic fixing roll has the strength, resilience, and heat resistance and is suitable for use in hot toner fixing assemblies of copying machines and printing machines.

4 Claims, 1 Drawing Sheet

ELASTIC FIXING ROLL

This application is a division, of application Ser. No. 08/223,896 filed Apr. 6, 1994, (status: abandoned).

FIELD OF THE INVENTION

The present invention relates to an elastic fixing roll, more particularly to an elastic roll suitable for use as a heating roll or pressure roll in a heated toner fixing assembly of a photocopy machine or printing machine.

BACKGROUND OF THE INVENTION

In a plain-paper copying (PPC) machine toner images applied to the surface of paper or other recording medium are fixated by application of heat and pressure. In certain PPC machines toner fixation is accomplished by passing the image-bearing recording medium between a hot thermal-fixation roll and a pressure roll to fuse the toner in place so that it is not easily removed from or is difficult to smear on the surface of the paper or other recording medium. When this type of thermal-fixation device is used the toner material is directly contacted by a roll surface and a portion of the toner adheres to the roll surface. Unless this is controlled, with subsequent rotation of the roll the adhered toner material may be redeposited on the recording medium resulting in undesirable offset images, stains, or smears; or, in severe cases, the recording medium may stick to the adhered toner material on the roll and become wrapped around the roll.

To perform satisfactorily in a thermal fixation assembly the material forming the pressing surfaces should be sufficiently temperature resistant to operate at the temperatures required to fuse the toners, capable of complying to and applying uniform pressure to the toner images, and have, or have imparted to their surface, release properties that minimize toner pickup. Additionally, these materials should be sufficiently durable in performing these fucnctions to be cost-effective.

In the past, solid rolls consisting of elastic materials such as urethane rubber, ethylene propylene rubber, silicone rubber, or fluorocarbon rubber have been used. Such elastic materials, when used alone, suffer the drawback of having relatively poor release properties and toner particles, paper particles, and the like, would cling to the rolls and lead to reduced image quality and a shorter use-life. When used in conjunction with release agents, for example, silicone oils applied to their surfaces, or release agents present in oil-less toners, improved release properties were obtained, however, often at the expense of durability as many of the elastic materials were degraded by the release agents and failed prematurely.

To overcome these problems solid rolls of elastic materials with a covering layer of fluoropolymer film or shrink-fit tubing have come into use. Fluoropolymer materials such as tetrafluoroethylene/hexafluoropropylene copolymer (FEP), tetrafluoroethylene/(perfluoroalkyl) vinyl ether copolymer (PFA), and polytetrafluoroethylene (PTFE) are well known for their temperature resistance, chemical stability, and excellent release properties; and their use in solid rolls have resulted in improved release properties and heat resistance, although at considerable sacrifice of mechanical properties such as elasticity, compliance, and surface hardness.

New needs in the printing and copying industry, for example, the desire for higher printing and copying speeds, more compact and lighter equipment, and the desire to print or copy onto surfaces of non-uniform thickness such as are created by envelope flaps, and the like, are such that even the improved roll materials no longer perform entirely satisfactorily. Higher operating speed may require higher operating temperature in order to accomplish image fixation with a shorter residence time at temperature and pressure. Higher operating temperatures may lead to reduced use-life in the materials. Altematvely, to operate at high speeds but at lower temperature, the residence time at temperature and pressure can be increased by increasing the nip width between the pressing surfaces. Generally, this can be done by increasing the contact pressure, which can lead to premature failure of the material; or by increasing the diameter of the roll, which conflicts with the desire for compactness.

To address these needs rolls made of elastic materials in the form of flexible porous foams have been developed. Rolls made of elastic porous foam materials have elasticity and compliance properties which allow the nip width to be increased without increasing the contact pressure between the pressing surfaces or increasing the roll diameter, and can print or copy onto substrate surfaces of non-uniform thickness without creating wrinkles in the image-bearing substrate. However, when made of the elastomeric materials described above, they suffer the same drawbacks of poor release properties or degradation associated with release agents. When covered with a layer of fluoropolymer material as described above the elasticity and compliance of the elastic foam body are compromised as the higher hardness and rigidity of the covering layer prevents the elasticity and compliance properties of the elastomer foam from being adequately exploited. Furthermore, because of the disparity in the physical properties of the materials, substantial stress is developed at the interface between the covering layer and the foam body so that the covering layer tends to separate from the foam body, and failure occurs.

It is a purpose of the present invention to provide an elastic fixing roll which has excellent release properties, surface contact characteristics, heat resistance, and durability; and which can satisfactorily address the current needs described above.

SUMMARY OF THE INVENTION

An embodiment of the present invention provides an elastic fixing roll comprising (a) a release surface material comprising porous polytetrafluoroethylene which has its pores impregnated with cross-linked synthetic rubber, and (b) an elastic porous body material of synthetic rubber foam; wherein the release surface material is adhered to the outer surface of the elastic porous body material by bonding of portions of the synthetic rubber of the release material to contacting portions of the synthetic rubber of the elastic porous body material.

Another embodiment of the invention provides an elastic fixing roll comprising (a) a release surface material comprising porous polytetrafluoroethylene which has its pores impregnated with cross-linked synthetic rubber, (b) a porous body material of open-celled synthetic rubber foam, and (c) a reinforcing material of cross-linked synthetic rubber impregnated into the pores of the elastic porous body material; wherein the release surface material is adhered to the outer surface of the elastic porous body material by bonding of portions of the synthetic rubber of the release material to contacting portions of the synthetic rubber of the reinforcing material.

DETAILED DESCRIPTION OF THE INVENTION

By elastic, as used herein, is meant capable of returning to an initial form or state after deformation.

By rubber foam, as used herein, is meant a light, porous, spongy rubber form, also variously known as foam rubber or sponge rubber.

By porous, as used herein, is meant simply having pores or voids, and is not descriptive of a specific structure. The pores or voids may be totally enclosed within and separated one from another by a solid, for example, as in a closed-cell foam; or they may be interconnected and form a network of passages throughout a structure, for example, as in an open-cell foam; or they may be present in a combination of both open and closed cells.

Figure 1:
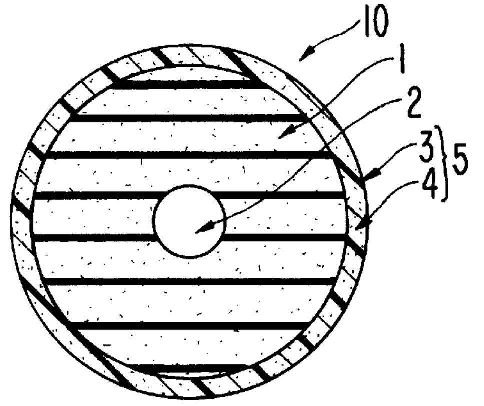
FIG. 1 is a cross-sectional view of an embodiment of the elastic fixing roll of the invention.

In FIG. 1 is shown an elastic fixing roll 10 of the invention in which an elastic porous body material 1 is axially mounted on a metal shaft 2. A release surface material 5 comprising a porous polytetrafluoroethylene film 3 impregnated with a synthetic rubber 4 is adhered to the outer surface of the body material 1.

The elastic porous body material 1 can be made of a foamed elastomer having either an open-celled or close-celled structure. Preferably the foamed elastomer is silicone rubber or fluorosilicone rubber. The silicone rubber and fluorosilicone rubber may be of a room temperature curing (RTV) type, low temperature vulcanizing (LTV) type, high temperature vulcanizing (HTV) type, or ultra-violet radiation curing type. Materials, processes, and equipment needed to form the above-described materials into porous rubber foams are known in the art and are available commercially.

Among the RTV types of silicone rubber or fluorosilicone rubber are two liquid types which develop as a rubber after a curing reaction at room temperature. The first type is available as a liquid comprising a reactive polysiloxane or reactive fluoropolysiloxane, a cross-linker, and a curing catalyst. This type results in a rubber following a curing reaction with the moisture in air when exposed to air. Almost all of these first types of RTV silicone rubbers and fluorosilicone rubbers are condensation reaction types. Depending on the kind of cross-linker used, there are de-alcoholated types in which alcohol is produced as a by-product, de-oximated types in which oxime is produced as a by-product, acetic acid-removed types in which acetic acid is produced as a by-product, as well as de-amidated, de-aminated, and de-acetonated types in which, respectively, amides, amines, and acetone are produced as by-products, and the like. In the case of de-alcoholated types, alkoxy groups undergo a hydrolysis reaction with the moisture in the air, and those parts in which alkoxy groups are present serve as the cross-linking sites, resulting in the gradual formation of a network structure which becomes the rubber. The other types also result in elastomers by similar reactions.

The second liquid type of RTV silicone rubber or fluorosilicone rubber consists of a primary agent in the form of a paste or liquid which contains a reactive polysiloxane or fluoropolysiloxane and a curing agent. The reactive polysiloxane or fluoropolysiloxane is allowed to react in the presence of a curing catalyst to form the rubber. The curing catalyst may be contained in either the primary agent or the curing agent. In contrast to the first type, this second type of RTV silicone rubber or fluorosilicone rubber is referred to as a deep-curing type in which the reaction proceeds completely. The curing mechanism is dassified into condensation reaction types and addition reaction types. In the case of the condensation reaction types the cross-linkers used, the curing reactions, and the by-products produced are as described above. In the case of the addition reaction types, the mixing together of the primary agent, curing agent, and catalyst initiates the addition reaction which results in the rubber. No by-products are produced in this case.

For LTV types of silicone rubber and fluorosilicone rubber the curing mechanism is similar to that of the RTV types. However, with these types, after the primary agents and curing agents are mixed together, the material is heated to a temperature in the range about 100° C. to 150° C. to promote rapid curing.

HTV types of silicone rubber and fluorosilicone rubber are also referred to as hot curing types because they contain a curing agent and a polyorganosiloxane with a high degree of polymerization, resulting in a rubber after vulcanization initiated by heating to a temperature of at least 150° C. HTV types include radical reaction types and addition reaction types, although the radical reaction types are more generally used and more practical. These radical reaction types involve the use of an organic peroxide as a vulcanizing agent. When heated to at least the decomposition temperature of the vulcanizing agent, the vulcanizing agent decomposes and produces free radicals. The free radicals excite the organic groups of the silicone or fluorosilicone polymer, resulting in the gradual formation of a network structure which becomes the rubber.

Ultraviolet radiation curing silicone rubber and fluorosilicone rubber are formed using similar materials and by similar reactions as described above except that curing agents are used by which curing is induced by exposure to ultraviolet radiation.

The elastic porous body material 1 made of rubber foam of the material described above is highly elastic and resilient. The rubber foam should have a pore volume in the range 30% to 95%, preferably in the range 50% to 90%. Rubber foam with a pore volume greater than 90% is too weak and has low durability. Rubber foam with a pore volume less than 30% has too little porous cellular structure to provide the elasticity, compliance, and resilience characteristics desired in the body material. Surface hardness of the rubber foam should be 70 degrees or less, preferably 50 degrees or less, as measured by Japan Rubber Association Standard SRIS-101. Surface hardness greater than 70 degrees creates excessive stiffness in the body material and thereby also fails to provide the desired elasticity, compliance and resilience characteristics. Preferably, the thickness of the rubber foam is in the range 5 millimeters to 30 millimeters.

The release surface material 5 is a composite material which is adhered to the outer surface of the elastic porous body material 1 and comprises a porous polytetrafluoroethylene film 3 impregnated with a synthetic rubber 4. The synthetic rubber 4 impregnated into the porous polytetrafluoroethylene film 3 is preferably a silicone rubber or fluorosilicone rubber of the types described above. The thickness of the release surface material 5 should be in the range 3 micrometers to 1000 micrometers. When the thickness is greater than 1000 micrometers the release surface material is too stiff and the elasticity and compliance properties of the body material cannot be taken advantage of. Conversely, when the thickness is less than about 3 micrometers, the surface material is quite weak and lacks durability in use.

Porous polytetrafluoroethylene sheet or film suitable for use in the invention can be made by processes known in the art, for example, by stretching or drawing processes, by papermaking processes, by processes in which filler materials are incorporated with the PTFE resin and subsequently removed to leave a porous structure, or by powder sintering processes. Preferably the porous polytetrafluoroethylene film 3 is porous expanded polytetrafluoroethylene film having a structure of interconnected nodes and fibrils, as described in U.S. Pat. Nos. 3,953,566 and 4,187,390 which fully describe the preferred material and processes for making them. The porous polytetrafluoroethylene film 3 of the release surface material 5 should have a thickness in the range 3 to 1,000 micrometers, preferably in the range 5 to 100 micrometers; a pore volume in the range 20 to 98 percent, preferably in the range 50% to 90%; and a nominal pore size in the range 0.05 to 15 micrometers, preferably in the range 0.1 to 2 micrometers.

The composite material of the release surface material 5 is made by combining the porous polytetrafluoroethylene film 3 with a synthetic rubber 4 so that the synthetic rubber is contained substantially within, and supported by, the polytetrafluoroethylene film. Examples of methods which can be used to form the composite material indude methods in which the porous polytetrafluoroethylene film is impregnated with uncured synthetic rubber, which is then cured; or a method in which polytetrafluoroethylene resin is mixed and compounded with uncured synthetic rubber and formed into a coherent sheet or film by methods known in the art, after which the synthetic rubber is cured. The amount of synthetic rubber incorporated with the polytetrafluoroethylene film should be such that it is equal to about 70% to 110%, preferably 80% to 100%, of the pore volume of the polytetrafluoroethylene film. An amount exceeding 110% of the pore volume of the polytetrafluoroethylene film results in an excess of synthetic rubber present on the film surface which can lead to problems, such as swelling of the rubber on the surface or separation of the rubber layer from the surface, so that adequate durability cannot be ensured. An amount of synthetic rubber less than 70% of the pore volume results in poor surface smoothness and diminished release properties.

To improve the performance of the release surface material 5 the synthetic rubber 4 of the composite may also include other materials, for example, such as silicone oil or other release agent to improve release properties, or fillers such as carbon black, graphite, boron nitride, alumina, silica, and other powders to impart thermal conductivity, electrical conductivity, wear resistance, and other useful properties to the release surface material.

When the synthetic rubber 4 in the release surface material 5 and the synthetic rubber of the elastic porous body material 1 is a silicone rubber or fluorosilicone rubber the release surface material 5 can be adhered to the body material 1 by effecting a bond between contacting portions of the rubber in the release surface material and the body material. In this case the bond can be made between any combination of the rubbers, i.e., either silicone rubber or fluorosilicone rubber of the types described earlier can be the rubber present in one or both of the materials to be joined. Some methods for adhering the release surface material 5 to the elastic porous body material 1 are described hereinbelow.

One method is to wrap a porous polytetrafluoroethylene film 3 onto a roll formed of an elastic porous body material 1 of silicone rubber or fluorosilicone rubber mounted on a metal shaft 2. The porous polytetrafluoroethylene film 3 is impregnated by uncured silicone rubber or fluorosilicone rubber in liquid form. The liquid uncured rubber is forced through the porous polytetrafluoroethylene film 3 so as to penetrate into the porous body material 1 after which excess liquid rubber is wiped from the surface of the porous polytetrafluoroethylene film. Then curing is initiated and the liquid cross-linked to form the synthetic rubber 4 of the release surface material 5 and to bond to the elastic porous body material 1. By the penetration of the rubber of the release surface material into the structure of the porous rubber body material a mechanical anchoring is effected in addition to adhesive attachment between the contacting portions of the rubber surfaces, and an exceptionally strong bond is obtained.

Another method is to first impregnate a porous polytetrafluoroethylene film 3 with uncured silicone rubber or fluorosilicone rubber in liquid form, after which the impregnated film is wrapped onto a roll formed of an elastic porous body material 1 of silicone rubber or fluorosilicone rubber mounted on a metal shaft 2. Then curing is initiated and the liquid cross-linked to form the synthetic rubber 4 of the release surface material 5 and to bond to the elastic porous body material 1. Thereby adhesive attachment is effected between contacting portions of the rubbers in the release surface material 5 and the body material 1, and a strong bond is obtained.

Yet another method is to first apply a primer containing a silane coupling agent to the surface of an elastic porous body material 1 of silicone rubber or fluorosilicone rubber mounted on a metal shaft 2. The primer is allowed to penetrate slightly into the porous body material. Then a polytetrafluoroethylene film 3 previously impregnated with a silicone rubber or fluorosilicone rubber as described above is wrapped onto the surface of the body material 1 and the primer is allowed to react. The primer forms a strong bond between contacting portions of the rubbers in the release surface material 5 and the body material 1, and the release surface material is firmly adhered to the elastic porous body material. An altemabve version of this method is to apply the primer containing a silane coupling agent to the surface of the rubber impregnated porous polytetrafluoroethylene film which contacts the surface of the body material instead of applying the primer to the surface of the body material.

The elastic fixing roll of the invention can also be formed by a very different method in which the internal surface of a tubular mold is lined with a porous polytetrafluoroethylene film impregnated with uncured silicone rubber or fluorosilicone rubber in liquid form. A metal shaft is axially centered in the mold and a suitable quantity of foamable silicone rubber or fluorosilicone rubber in liquid form is introduced into the mold cavity, and foaming is initiated. The foaming liquid expands to fill the cavity and intimately contact the impregnated polytetrafluoroethylene film lining the inside of the mold, thus forming a porous body material mounted on a metal shaft and adhered to the impregnated polytetrafluoroethylene film. In the course of the process a portion of the uncured rubber in the impregnated polytetrafluoroethylene film penetrates into the the pores of the foamed body material. When the same type of silicone rubber or fluorosilicone rubber is used to impregnate the porous polytetrafluoroethylene film and form the foamed body material, the reactive groups of the rubbers interconnect, and after cross-linking and curing, an exceptionally strong bond between the release surface material and elastic porous body material is formed. As stated earlier, strong bonds can also be achieved between rubbers of different types. For example, a strong bond can be obtained when uncured HTV rubber is heated while contacting a cured rubber of another type. Thus, for example, a polytetrafluoroethylene film containing a fully cured silicone rubber or fluorosilicone rubber can be used to line the inner surface of the tubular mold and HTV silicone rubber or fluorosilicone rubber used to form the elastic porous body material of the elastic fixing roll of the invention.

The advantages provided by the elastic fixing roll of the invention are many. The composite release surface material through its combination of porous expanded polytetrafluoroethylene film with silicone rubber, fluorosilicone rubber or fluorocarbon rubber provides excellent release properties, oil swelling resistance, mechanical strength, and wear resistance. It is also highly resistant to heat, capable of operating in the temperature range 200° C. to 250° C. The network of expanded polytetrafluoroethylene throughout the structure significantly increases the strength of the composite while providing support to the synthetic rubber contained therein, without adversely influencing the the elasticity, compliance or resilience of the rubber. The soft, flexible body material provides for increased nip width without requiring increased roll diameter or harmfully high compressive forces and is sufficiently compliant to effectively process paper materials, even those of differing thicknesses such as an envelope, without smearing the images or wrinkling the paper. Because of the excellent bonding between the rubber of the release surface material and the rubber of the body material exceptional peeling resistance at the interface between them is obtained.

It has also been determined that the strong bonding mechanism described above permits an elastic fixing roll of the invention to be made in which the body material is not entirely formed of a porous synthetic rubber foam, so long as the necessary elasticity and compliance can be developed at the surface of the roll. The body material of such a roll can be made of stiffer, more open material which is less expensive and more easily fabricated than a synthetic rubber foam of silicone rubber, fluorosilicone rubber or fluorocarbon rubber. Such a roll is depicted in FIG. 2 and described hereinbelow.

Figure 2:
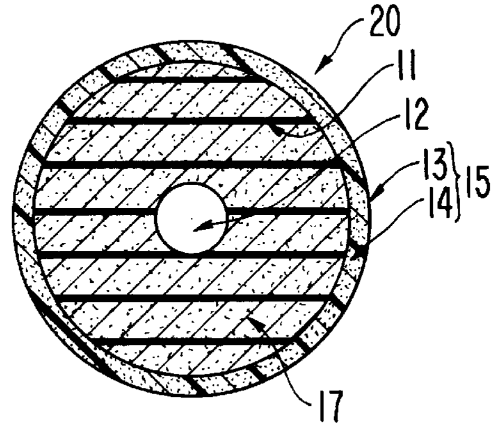
FIG. 2 is a cross-sectional view of an embodiment of the invention which has a reinforcing material.

In FIG. 2 is shown an elastic fixing roll 20 of the invention in which a non-rigid porous body material 11 is axially mounted on a metal shaft 12. The porous body material 11 contains a reinforcing material 17 adhered to the internal surface of the body material 11. A release surface material 15 comprising a porous polytetrafluoroethylene film 13 impregnated with a synthetic rubber 14 is adhered to the outer surface of the body material 11.

The porous body material 11 should be a non-rigid open-celled foam or other continuous pore structure having a pore volume of at least 30%, preferably in the range 50% to 90%. Suitable non-rigid porous materials are commercially available and can be of synthetic polymers such as, but not limited to, polyester polyurethane, polyether polyurethane, polyvinyl chloride, polyethylene, polystyrene, and the like. By non-rigid is meant that the material is not a hard, stiff, brittle material.

A porous elastic reinforcement 17 is formed within the porous body material 11 configuous with the release surface material 15 and extending throughout the porous body material. The reinforcing material 17 is silicone rubber or fluorosilicone rubber applied in liquid form to the surface of the porous body material 11 so as to impregnate the porous body material. The impregnated body material is then flexed, for example, by rolling it or wringing it, to squeeze out excess liquid and to distribute the liquid rubber in the pores of the body material so as to coat the internal surfaces of the porous support material; and thereby maintaining porosity within the reinforced body material. Such a method of coating the internal surfaces of a non-rigid porous material is disclosed in Japanese Laid-Open Patent Application 58-17129.

The amount of silicone rubber or fluorosilicone rubber impregnated into the porous body material to form the elastomeric reinforcement region should be such that the bulk density of the reinforced porous body material is in the range 50 to 300 kg/m$^3$, preferably in the range 100 to 200 kg/m$^3$. When the amount of rubber forming the reinforcement increases the bulk density to more than about 300 kg/m$^3$ the result is diminished pore volume as well as inadequate elasticity and resilience, so that sufficient flexibility and surface compliance is not obtained. When the amount of rubber forming the reinforcement increases the bulk density to less than 50 kg/m$^3$, the internal surfaces of the pores in the body material are coated with rubber in an amount insufficient to provide reinforcement, heat resistance or durability. The reinforced body material produced as described has good surface elasticity and resilience. The surface hardness should be 70 degrees or less, preferably 50 degrees or less, and the pore volume should be in the range 30% to 95%, preferably in the range 50 to 90%.

The release surface material 15 is a composite material which is adhered to the outer surface of the elastic porous body material 11 and comprises a porous polytetrafluoroethylene film 13 impregnated with a synthetic rubber 14. The release surface material 15 is prepared in the same manner and with the same materials as specified hereinabove in the description of the first embodiment of the invention. Likewise, in the case where the synthetic rubber 14 in the release surface material 15 and the synthetic rubber forming the elastomeric reinforcement 17 are silicone rubber or fluorosilicone rubber, the release surface material 15 is adhered to the reinforced body material 11 by the same methods as described in the first embodiment of the invention. Again, strong bonding is achieved between the release surface material and the reinforced body material by the mechanisms described earlier, and the bond can be made between any combination of the rubbers, i.e., either silicone rubber or fluorosilicone rubber of the types described earlier can be the rubber present in one or both of the materials to be joined.

Figure 3:
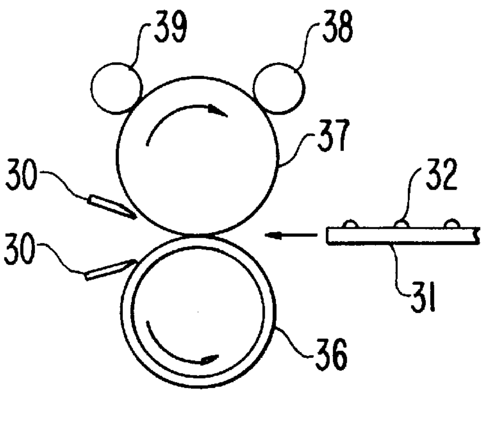
FIG. 3 is a side schematic view of a toner fixation assembly of a PPC machine incorporating an embodiment of the invention.

In FIG. 3 is shown a side schematic view of a toner fixation assembly of a PPC machine. The schematic view depicts a heated metal roll 37 pressing against the elastic fixing roll 36 of the invention. An oil application roll 38 contacts the fixing roll and applies a release agent to the fixing roll surface to minimize toner pickup and facilitate its removal. A substrate 31 printed with an unfixed toner image 32 is seen prepared to pass through the nip between the heated metal roll 37 and the elastic fixing roll 36. Guide bars 30 guide the substrate away from the assembly after it passes through the nip. Cleaning roll 39 removes toner and release agent from the surface of the heated metal roll.

EXAMPLE 1

An elastic fixing roll 10 as shown in FIG. 1 was prepared as follows:

An 8 mm diameter steel shaft 2 was inserted axially into an elastic porous body material 1 of silicone rubber foam.

The silicone rubber foam had an outside diameter of 30 mm, and inside diameter of 8 mm, and a bulk density of 330 kg/m$^3$. The surface hardness of the silicone rubber foam was 28 degrees. An adhesion primer for silicone rubber (Primer-C, manufactured by Shin-Etsu Chemical Co., Ltd.) was sprayed onto the surface of the silicone rubber foam and air dried.

A porous expanded polytetrafluoroethylene film 3 having a thickness of about 20 micrometers, a nominal pore size of about 2 micrometers, and a pore volume of about 90% was wrapped two times around the body material 1 of silicone rubber foam. An RTV silicone rubber (KE-106, manufactured by Shin-Etsu Chemical Co., Ltd.) was applied to the surface and impregnated into the porous polytetrafluoroethylene film to substantially fill the pore volume. The excess silicone rubber was wiped from the porous expanded polytetrafluoroethylene film surface and the roll was heated in a high temperature tank at 100° C. for one hour to cross-link and cure the silicone rubber. The composite release surface material 5 formed of the porous expanded polytetrafluoroethylene and cross-linked RTV silcone rubber 4 had a thickness of about 40 micrometers. The outside diameter of the elastic fixing roll 10 thus formed was about 30 mm, and the surface hardness of the roll was 30 degrees.

The roll thus produced was cut so that the interface between the porous body material 1 and the release surface material 5 could be examined by microscope, whereby it was verified that bonding of the cross-linked silicone rubber of the release surface material to the silicone rubber foam of the porous body material had occurred.

The elastic fixing roll was tested in a plain paper copying machine in a toner fixation assembly of the type shown in FIG. 3. Good release properties and durability were obtained when the roll was put under constant pressure. No offset printing problems occurred during a copy test of 100,000 paper sheets, nor was any toner found adhering to the surface of the elastic fixing roll at the conclusion of the test. No deterioration as a result of swelling caused by release oil was found. A copy test involving the use of printed substrates in the form of envelopes having seams with differences in thickness of 120 micrometers produced no wrinkles or the like in the substrates, and resulted in good copy images.

EXAMPLE 2

An elastic fixing roll 20 as shown in FIG. 2 was prepared as follows.

An 8 mm diameter shaft 12 was inserted axially into a porous body material 11 of open-cell polyester polyurethane foam. The polyester polyurethane had an outside diameter of 30 mm and an inside diameter of 8 mm.

A reinforcing material 17 was impregnated into the body material 11 as follows:

A predetermined amount of addition reaction hardening silicone rubber (KE1300, manufactured by Shin-Etsu Chemical Co., Ltd.) was poured on a plate glass surface. The polyester polyurethane foam body material 11 was rolled in the liquid silicone rubber until it was impregnated into the porous support material. The impregnated support material was then repeatedly rolled on a corrugated surface causing it to flex, thus distributing the liquid silicone rubber in the pores of the body material so as to coat the internal surfaces of the porous body material and thereby maintaining internal porosity of interconnected pores through the reinforced body material. The reinforced porous body material had a surface hardness of 13 degrees and a bulk density of 220 kg/m$^3$.

The release surface material 15 was prepared and adhered as described in Example 1. The finished elastic fixing roll had a surface hardness of 15 degrees.

The elastic fixing roll of Example 2 was examined and tested as described in Example 1. It was verified microscopically that bonding at contacting portions of the silicone rubber of the release surface material 15 and the silicone rubber of the reinforcement 17 of the porous body material 11 had occurred. The results of the tests were the same as reported in Example 1.

We claim:

1. A method for making an elastic fixing roll comprising a shaft, a porous elastic body material, and a nonporous release surface material, comprising the steps of:

(a) providing a shaft having coaxially mounted thereon an elastic porous body material of foamed synthetic rubber in the form of a cylindrical roll;

(b) forming a release surface material precursor having an outward-facing surface and an inward-facing surface, and covering said elastic porous body with said release surface precursor;

said precursor comprising a porous expanded polytetrafluoroethylene film; said precursor formed by impregnating and substantially filling the pores of said film with uncured synthetic rubber either before or after covering said elastic porous body with said film;

said uncured liquid rubber filling the pores of said film so as to provide a smooth outward-facing surface and so that, at the inward-facing surface, contact is made between said uncured synthetic rubber of said precursor and said synthetic rubber of said porous body material;

(c) curing said uncured synthetic rubber, thereby forming a strong bond between the synthetic rubber of the release surface material and the synthetic rubber of the porous body material and completing formation of the elastic fixing roll.

2. The method for making an elastic fixing roll as recited in claim 1, wherein the release surface material precursor is formed in place by first wrapping said porous expanded polytetrafluoroethylene film around said elastic porous body material.

3. The method for making an elastic fixing roll as recited in claim 1, wherein the release surface material precursor is formed separately, and a silicone type adhesive agent is applied to either surface to be joined.

4. The method for making an elastic fixing roll as recited in claim 1, 2, or 3, wherein the synthetic rubber of said release surface material and said porous body material are selected from the class consisting of silicone rubber and fluorosilicone rubber.

* * * * *